_United States Patent Office_

3,637,806
Patented Jan. 25, 1972

3,637,806
PROCESS FOR PRODUCING 3-DIMETHYLAMINO 4-PHENYL-4-CARBETHOXY-$\Delta^1$-CYCLOHEXENE
Gerhard Satzinger, Gundelfingen, Freiburg, Germany, assignor to Warner-Lambert Company, Morris Plains, N.J.
No Drawing. Filed Oct. 22, 1968, Ser. No. 769,718
Int. Cl. C07c *101/36*
U.S. Cl. 260—471 A                6 Claims

ABSTRACT OF THE DISCLOSURE

A process is described for producing 3-dimethylamino-4-phenyl-4-carbethoxy-$\Delta^1$-cyclohexene by the reaction, at an elevated temperature, of crotonaldehyde and ethyl $\alpha$-phenyl-$\beta$-dimethylamino propionate in the presence of a water-absorbing agent.

The compound 3 - dimethylamino-4-phenyl-4-carbethoxy-$\Delta^1$-cyclohexene is disclosed in my U.S. patent application Ser. No. 587,673, filed Oct. 19, 1966, now abandoned, as being therapeutically active and useful as an analgesic.

BRIEF DESCRIPTION OF THE INVENTION

Crotonaldehyde, ethyl $\alpha$-phenyl-$\beta$-dimethylamino propionate and a water-absorbing agent are charged into a suitable reaction vessel and, with stirring, the mixture is heated at a temperature elevated above room temperature until the reaction is complete.

The product which is thus obtained consists substantially of an isomeric mixture comprising 3-cis-dimethylamino-4-phenyl-4-cis-carbethoxy - $\Delta^1$ - cyclohexene and 3-trans - dimethylamino-4-phenyl-4-trans-carbethoxy-$\Delta^1$-cyclohexene. The individual compounds making up the mixture can be separated by appropriate methods.

DETAILED DESCRIPTION

In carrying out the process of the invention, crotonaldehyde, ethyl $\alpha$-phenyl-$\beta$-dimethylamino propionate and a water-absorbing agent are introduced into a suitable reaction vessel. The reactants should be charged into the reaction vessel in such quantities as to provide a reaction mixture which contains a ratio of about 1.5 mol of crotonaldehyde and from about 0.5 to about 1.0 mol of water-absorbing agent for each mol of ethyl $\alpha$-phenyl-$\beta$-dimethylamino propionate present therein. The reaction mixture is heated, with stirring, at a temperature within the range of from about 90° C. to 140° C. until the reaction is complete. In the preferred practice of the invention, the reaction mixture is heated at a temperature of about 120° C. for a period of about six hours.

In general, any readily hydrolyzable organic compound can be employed as the water-absorbing agent. Certain esters, nitriles and imides are especially well suited for use. Thus, for example, alkyl esters of carbonic acid, such as, diethyl carbonate; ethyl esters of orthoacids, for example, the ethyl ester of orthoacetic acid, the ethyl ester of orthobenzoic acid, etc.; nitriles, such as butyronitrile; and imides, such as succinimide, etc.; are suitable for use as the water-absorbing agent.

The process of this invention yields a product which is a mixture of the cis- and trans-isomers of 3-dimethylamino-4-phenyl-4-carbethoxy-$\Delta^1$-cyclohexene, namely, 3-cis-dimethylamino-4-phenyl-4-cis-carbethoxy - $\Delta^1$ - cyclohexene and 3-trans-dimethylamino-4-phenyl-4-trans-carbethoxy-$\Delta^1$-cyclohexene. The isomeric mixture can be separated readily into its components by any convenient means. One suitable separation method is described in my U.S. patent application Ser. No. 690,794, filed Dec. 15, 1967, now abandoned. In that method, the isomeric mixture is dissolved in a strong mineral acid, such as, hydrochloric acid, and the solution is adjusted to a pH of from about 2.5 to about 3.5. To this acidic solution, an aqueous solution of from about 15% to about 40%, preferably about 20%, zinc chloride is gradually added. Zinc chloride reacts specifically and exclusively with the cis-isomer to form a complex therewith. The complex crystallizes out of solution. Zinc chloride does not react with the trans-isomer and, hence, the trans-isomer remains dissolved in the acidic solution. Accordingly, by filtration, one can separate the crystalline complex of zinc chloride and the cis-isomer from the acidic solution of the trans-isomer.

The trans-isomer can be obtained readily from the acidic solution in which it is dissolved. In one suitable method, an organic solvent, preferably chloroform, is added to the trans-isomer-containing acidic solution and the mixture is made alkaline, preferably using concentrated aqueous ammonia. The organic phase of the alkaline mixture is separated, the organic solvent is removed and the residue is taken up in a suitable solvent, e.g. ethyl acetate or a mixture of ethyl acetate and acetone. A concentrated solution of gaseous hydrogen chloride in a suitable solvent, e.g. ethyl acetate, is added to adjust the pH of the residue-containing solution to within the range of 3.5 to 4.0. A precipitate of the hydrochloride salt of the trans-isomer forms. The precipitate is recovered by filtration and recrystallized.

The pure cis-isomer can be regenerated without difficulty from the complex of zinc chloride and the cis-isomer. This can be accomplished, for example, by adding to the complex an organic solvent, such as, chloroform, methylene chloride or benzene containing 10% to 20% ethyl acetate. Chloroform is the solvent which is used in the preferred embodiment of the invention. A strong base, such as, concentrated ammonia, is added to adjust the pH to form about 8.5 to about 9.5. The organic phase is separated and the cis-isomer is recovered therefrom by fractionation.

As indicated heretofore, the compound produced by the present process, namely, 3-dimethylamino-4-phenyl-4-carbethoxy-$\Delta^1$-cyclohexene, and its use as an analgesic, is disclosed in my pending U.S. patent application Ser. No. 587,673, now abandoned. A complete pharmocological profile of the trans-isomer is set forth in that application including data on its (1) acute toxicity, (2) analgesic effect, (3) effect on respiration and (4) effect on involuntary muscles. The present invention provides a convenient, relatively uncomplicated alternate method for synthesizing the compound.

For a fuller understanding of the nature and objects of the invention, reference may be had to the following example which is given merely as a further illustration of the invention and not to be construed in a limiting sense.

EXAMPLE

In this example, 221.3 grams (1 mol) of ethyl $\alpha$-phenyl-$\beta$-dimethylamino propionate, 105.1 grams (1.5 mol) of crotonaldehyde and 118.1 grams (1 mol) of diethyl carbonate were charged into a reaction vessel and the mixture was heated, with stirring, for a period of about six hours at a temperature of about 120° C. At the end of that period of time, the reaction mixture, while still warm, was mixed with 1 liter of 2 N hydrochloric acid. The mixture was then extracted with 500 ml. of ethyl acetate. The organic phase and aqueous phase were separated and the aqueous phase was made alkaline using 550 ml. of 4 N sodiumhydroxide.

The deposited oil which was thus obtained was then distilled under low vacuum. The isomeric mixture comprising 3 - cis - dimethylamino - 4 - phenyl - 4 - cis-carbethoxy - $\Delta^1$ - cyclohexene and 3 - trans - dimethylamino - 4 - phenyl - 4 - trans carbethoxy - $\Delta^1$ - cyclohexene distilled at 95° C. to 100° C./0.01 torr.

The isomeric mixture was separated into its components in the following manner: 137 grams (0.5 mol) of the mixture was dissolved in 550 ml. of 1 N hydrochloric acid. The solution was diluted to 800 ml. and the pH adjusted to 2.5 to 3.5. Thereafter, a solution of 68 grams zinc chloride dissolved in 550 ml. of water was added gradually, with stirring. The mixture was stirred at room temperature for about one hour, following which it was stirred for one hour at a temperature of 0° C. The complex of zinc chloride and the cis-isomer came out of solution as colorless crystals. The crystalline complex was recovered by filtration under strong pressure.

The aqueous acidic filtrate, obtained from the previous step, was poured into a mixture 170 ml. of concentrated aqueous ammonia (25% to 27% $NH_3$) in 60 ml. of water, with stirring. Thereafter, 300 ml. of chloroform was added to the solution and thoroughly mixed therewith. The chloroform phase was recovered, washed twice with water and dried over potassium carbonate. The potassium carbonate was removed by filtration, following which the chloroform was distilled off. The residue, which remained after the chloroform was removed, was dissolved in 150 ml. of ethyl acetate. The solution was then adjusted to a pH 3.5 to 4.0 using a 4 molar solution of gaseous hydrogen chloride in ethyl acetate. After a short period of time, 3 - trans - dimethylamino - 4 - phenyl - 4 - trans - carbethoxy - $\Delta^1$ - cyclohexene, in the form of its hydrochloride salt, precipitated out of solution. Filtration yielded the hydrochloride salt of the trans-isomer base; melting point at 159° C.

*Analysis.*—Calcd. (percent): C, 65.89; H, 7.81; Cl, 11.45; N, 4.52. Found (percent): C, 65.60; H, 7.62; Cl, 11.35; N, 4.70.

The cis-isomer was recovered quantitatively as the free base by reacting the complex of zinc chloride and the cis-isomer with aqueous ammonia.

It is understood that the foregoing detailed description is given merely by way of illustration and that many variations may be made therein without departing from the spirit of my invention.

Having described my invention, what I desire to secure by Letters Patent is:

1. A process for the production of a mixture of the isomers of 3 - dimethylamino - 4 - phenyl - 4 - carbethoxy-$\Delta^1$-cyclohexene which comprises heating ethyl $\alpha$-phenyl-$\beta$-dimethylamino propionate with crotonaldehyde at a temperature within the range of from about 90° C. to about 140° C. in the presence of a water-absorbing agent, there being present in the reaction mixture a ratio of about 1.5 mol of said crotonaldehyde and from about 0.5 to about 1.0 mol of said water-absorbing agent for each mol of said propionate compound present therein.

2. The process of claim 1 wherein the water-absorbing agent is diethyl carbonate.

3. The process of claim 2 wherein the reaction mixture is heated at a temperature of about 120° C. for a period of about six hours.

4. A process for the production of a mixture of the isomers of 3 - dimethylamino - 4 - phenyl - 4 - carbethoxy-$\Delta^1$-cyclohexene which comprises heating ethyl-$\alpha$-phenyl-$\beta$-dimethylaminopropionate with crotonaldehyde at a temperature within the range from about 90° C. to about 140° C. in the presence of a water-absorbing agent, there being present in the reaction mixture a ratio of about 1.5 mol of said crotonaldehyde and from about 0.5 to about 1.0 mol of said water absorbing agent for each mol of said propionate compound present therein wherein the mixture of 3 - cis - dimethylamino - 4 - phenyl - 4 - cis-carbethoxy - $\Delta^1$ - cyclohexene and 3 - trans - dimethylamino - 4 - phenyl - 4 - cis - carbethoxy - $\Delta^1$ - cyclohexene are isolated separately from the isomeric mixture.

5. The process of claim 4 wherein the water absorbing agent is diethyl carbonate.

6. The process of claim 5 wherein the reaction mixture is heated at a temperature of about 120° C. for a period of about six hours.

References Cited

Fieser, L. F. et al., Organic Chemistry, 3rd edition, (1956), pub. by Reinhold Pub. Corp., New York, p. 914.

LORRAINE A. WEINBERGER, Primary Examiner

L. A. THAXTON, Assistant Examiner

U.S. Cl. X.R.

260—999